United States Patent Office 2,742,452
Patented Apr. 17, 1956

2,742,452

PROCESS OF CARRYING OUT THE POLYCONDENSATION OF GLYCOL ESTERS OF TEREPHTHALIC ACID

Erwin Heisenberg, Erlenbach (Main), Erhard Siggel, Laudenbach (Main), and Anton Watzl, Kleinwallstadt (Main), Germany, assignors to Vereinigte Glanzstoff-Fabriken A. G., Wuppertal-Elberfeld, Germany, a corporation of Germany No Drawing. Application August 2, 1954,
Serial No. 447,384

Claims priority, application Germany August 3, 1953

2 Claims. (Cl. 260—75)

It is known that the polycondensation of glycol esters of terephthalic acid can be carried out by heating the glycol ester of terephthalic acid to temperatures above the melting point of the monomer and continuing the condensation until the desired degree of polycondensation is attained. This method is marked by the disadvantage that it is difficult to remove the ethylene glycol which is liberated during the reaction from the reaction mixture. For this purpose a vacuum must be applied to obtain a product which exhibits good spinning properties.

A method is also known whereby the polycondensation is conducted in solution rather than in the melt. This method allows for operation without the application of vacuum but it is difficult to remove the solvent completely from the finished polycondensates. The solvents employed in such solvent condensation are sensitive to oxygen in the temperature range involved so that undesired break-in or penetration of oxygen or air produces very rapid yellowing of the solvent which makes it necessary to purify the solvent, by distillation, before it is reused.

The instant invention eliminates the aforesaid disadvantages. No solvent is used, the polycondensation being carried out in dispersion and without the application of vacuum. By means of the present invention the ethylene glycol liberated from the reaction mixture may be rapidly and completely removed as a result of which the reaction time is considerably shortened.

In accordance with this invention the glycol ester of terephthalic acid is finely distributed by means of vigorous stirring in a paraffin hydrocarbon having a boiling point of 300° and higher. Then the vapors of aromatic or hydro-aromatic compounds devoid of functional groups (thus being inert) are led through the dispersion. As a result, the glycol which is split off during the condensation is rapidly removed. The polyester formed precipitates because of its high specific gravity, and deposits at the bottom of the reaction vessel upon completion of the reaction. It can be directly withdrawn and used since it is rapidly separable from the paraffin hydrocarbon. The polyester is devoid of any dispersion agent employed. Thus, in contrast to condensation in a solvent, the paraffin hydrocarbon used as the dispersing agent can be rescued as the dispersing vehicle for subsequent reactions for an unlimited number of times and without requiring purification. By using the method of this invention the decomposition or yellowing of the dispersing agent is effectively precluded even if there be penetration of oxygen. Indeed, quite to the contrary the dispersing agent protects the dispersed polyester from contact with oxygen. Consequently light colored products of good physical data are always obtainable.

A specific advantage of the process of this invention is that it allows one readily to obtain a distribution condition which results in polycondensation to such extent that the K values produced are of the order of about 50. Polycondensates of this character are particularly suitable for spinning processes since the viscosity thereof in the molten condition is within a range which does not impose high demands on the spinning apparatus. With the known methods of polycondensation, either the melt-condensation or solvent-condensation, great care must be taken to utilize exact quantities of chain breaking means in order to avoid condensations of excessive extent. If the condensates produced are of excessive molecular weight, difficulties are imposed on the spinning apparatus without any appreciable contribution to the quality of the fiber produced. Furthermore, the effectiveness of the known chain breakers is not always sufficiently well defined so that at times unevenness or lack of uniformity of the products is observed.

In contrast thereto, the method of this invention allows for the production of polycondensates of very well defined degrees of condensation within short condensation intervals, the polycondensates being just within the viscosity range that is optimal for the spinning operation. According to experience, that optimum is at the solution viscosity of the condensation product of y relative=1.70, K value=51.7, (determined as 1 percent solution in m-cresol at 25° C.).

The following are examples in accordance with this invention.

Example 1

100 grams of dimethyl terephthalate were transesterified in the usual manner with 64 grams of ethylene glycol; and most of the excess glycol subsequently distilled off. Toward the end of the distillation, 80 cc. of a paraffin oil having a boiling point of 350° C. were added and a rapidly rotating agitator turned on.

While elevating the temperature to 265° C., a current of benzene vapor, heated to 180° C. was conducted through the final dispersed mixture for a period of 3½ hours. After discontinuing the heating and stopping the agitator the dispersion rapidly separated, and the reaction product deposited on the bottom of the vessel. It showed very good fiber forming properties at Fp 249.5° C. and a K value of 49.5.

Example 2

After completing the transesterification as described in Example 1, 100 cc. of paraffin oil were added to the reaction mixture heated to 270° C. and a nitrogen-benzene vapor stream at a temperature of 147° C., flowing at a velocity of 30 liters per hour was led through the reaction mixture for 3 hours while it was vigorously stirred.

Upon cessation of the heating and the stirring the product obtained showed excellent fiber forming properties at Fp 249.5° C. and a K value of 51.0.

We claim:

1. Process of polycondensing glycol esters of terephthalic acid which comprises heating the esters to polycondensation temperatures after dispersion thereof in paraffin hydrocarbons having melting points above 300° C. while passing through said dispersion vapors of the group consisting of inert aromatic and hydro-aromatic hydrocarbons.

2. Process in accordance with claim 1 wherein vaporized benzene is passed through the dispersion.

No references cited.